United States Patent [19]

McWhinnie

[11] 4,332,629
[45] Jun. 1, 1982

[54] METHOD OF MAKING EXTENDED STRIP OF LEAD-ANTIMONY ALLOYS FOR BATTERY ELECTRODES

[75] Inventor: John McWhinnie, Bolton, England

[73] Assignee: Chloride Group Limited, London, England

[21] Appl. No.: 162,951

[22] Filed: Jun. 25, 1980

[30] Foreign Application Priority Data

Jun. 29, 1979 [GB] United Kingdom ................. 7922673

[51] Int. Cl.³ ............................................. C22C 11/00
[52] U.S. Cl. ................................ 148/11.5 R; 148/400
[58] Field of Search ................. 75/166 B; 148/11.5 R, 148/32

[56] References Cited

U.S. PATENT DOCUMENTS 2,499,566  3/1950  Bouton et al. ................. 148/11.5 R
3,706,605 12/1972  Newbury et al. .............. 148/11.5 R
3,888,703  6/1975  Tilman et al. ................. 148/11.5 R
3,959,016  5/1976  Tsuda ............................ 148/11.5 R

*Primary Examiner*—Upendra Roy
*Attorney, Agent, or Firm*—Oblon, Fisher, Spivak, McClelland & Maier

[57] ABSTRACT

A method of making an extruded strip less than 1.27 mms thick of lead antimony alloy containing 1 to 2% by weight antimony, the strip having an aspect ratio in excess of 10:1 comprises supplying the alloy at a temperature of 200° C. to 280° C. to an extrusion die and forcing it therethrough so that its temperature as it emerges from the die is in excess of 200° C. and quenching the strip as it emerges from the die whereby its tensile strength within 6 hours of emerging from the die is about 35 Newtons/square mm². This strip is suitable for conversion to a battery electrode.

8 Claims, 1 Drawing Figure

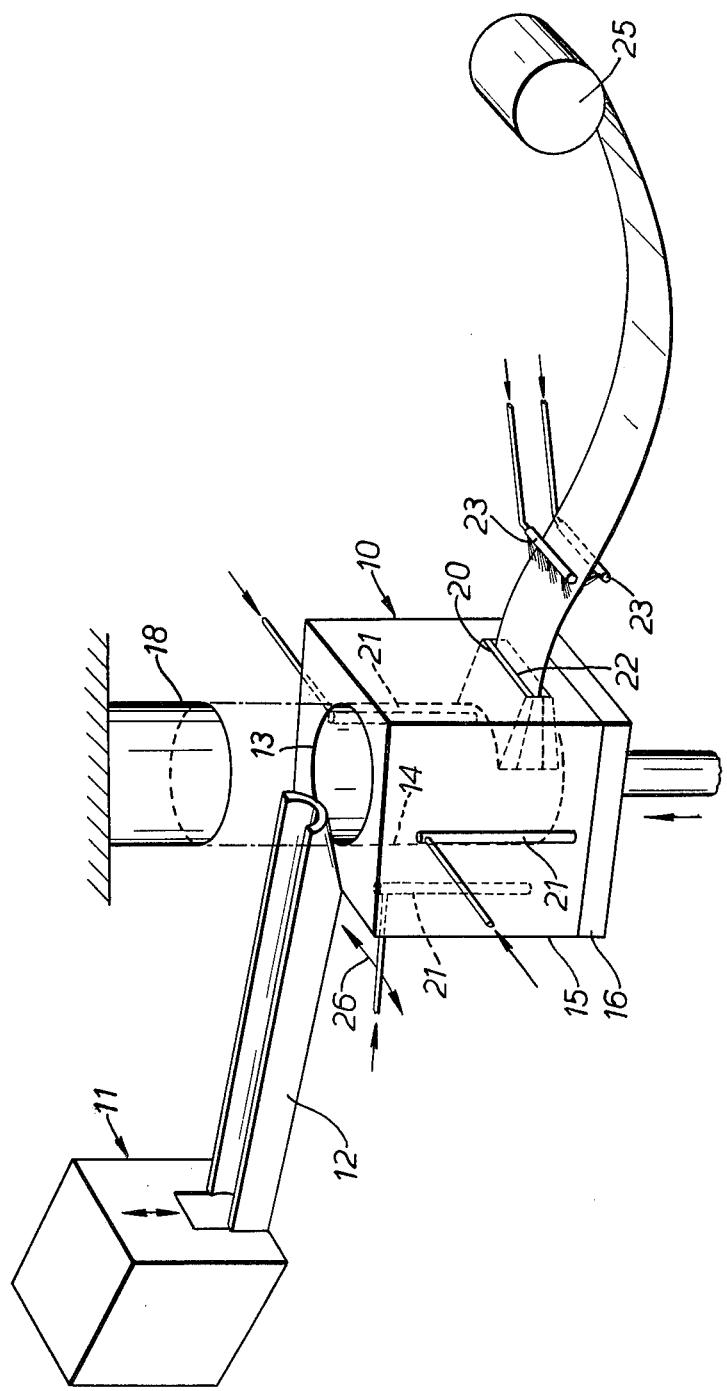

METHOD OF MAKING EXTENDED STRIP OF LEAD-ANTIMONY ALLOYS FOR BATTERY ELECTRODES

FIELD OF THE INVENTION

The present invention relates to lead acid electric storage batteries and in particular to the production of electrodes therefor and extends to a novel alloy, a novel process for fabricating the alloy into an electrode and to a cell or battery incorporating such electrodes.

BACKGROUND OF THE INVENTION

We have investigated the use of certain lead antimony alloys in a novel process for making electrode supports. This process involves producing a cylindrical billet of the alloy, preferably by casting, peeling a long strip of metal from the periphery of the billet, and then converting the strip to a battery electrode structure preferably by slitting and expanding the strip to expanded mesh form, after which it may be cut into individual electrodes and pasted with active material or be pasted as a strip and then cut to length.

We have found that when the cylindrical billet is gravity cast cracking and voids are also liable to occur. In addition the material as peeled is soft when the antimony content is about 1.3 to 1.9%.

Alloys of such composition are desirable for use in low maintenance batteries.

We have found that unexpectedly strong strips of unconventional aspect ratio of lead antimony alloy can be produced by extruding certain alloy compositions at defined elevated temperatures and then chilling the extruded strips rapidly.

BRIEF DESCRIPTION OF THE DRAWING

FIGURE is a perspective view of the extrusion die used to produce the extruded alloy having high tensile strength in accordance with the present invention.

SUMMARY OF THE INVENTION

The invention thus extends to a method of making a strip less than 0.05 inches (1.27 mms) thick, of lead antimony containing 1 to 2.5% by weight especially 1.3 to 1.9% antimony, the amounts of any other ingredients being less than the amount of antimony, the strip having an aspect ratio of width to thickness in excess of 10:1 which comprises supplying the alloy at a temperature in the range 200° C. to 280° C. e.g., 220° C. to 280° C. to an extrusion die having the said aspect ratio and forcing it therethrough and quenching the strip as it emerges from the die whereby its tensile strength within 6 hours of emerging from the die is at least 35 Newtons/mm$^2$.

The invention also extends to a sheet of lead antimony alloy containing 1.3 to 1.9% by weight antimony having a thickness in the range of 0.2 to 1.5 e.g., 0.7 to 1.2 mms and an aspect ratio of at least 10:1 preferably in excess of 20:1 especially in the range 50:1 to 200:1 e.g., 75:1 to 150:1, and a tensile strength in excess of 40 Newtons/square millimeter.

The invention further extends to a method of making an electrode for a lead acid storage battery which comprises supplying a lead antimony alloy containing 1.3 to 1.9% by weight antimony at a temperature in the range 200° C. to 280° C. to an extrusion die and forcing it therethrough so that its temperature as it emerges from the die is not less than 200° C., the die having a ratio of width to thickness in excess of 100:1, and quenching the strip as it emerges from the die whereby its tensile strength within 6 hours of emerging from the die is at least 35 Newtons/square millimeter.

The invention also extends to an extruded sheet of lead antimony alloy containing 1.3 to 1.9% by weight antimony having a thickness in the range of 0.2 to 1.5 e.g., 0.7 to 1.2 mms and a ratio of width to thickness in excess of 10:1 preferably in excess of 20:1 especially in the range 50:1 to 200:1 e.g., 75:1 to 150:1, and a tensile strength in excess of 45 Newtons/square millimeter.

The invention further extends to a method of making an electrode for a lead acid storage battery which comprises supplying a lead antimony alloy containing 1.3 to 1.9% by weight antimony at a temperature at the range 200° C. to 280° C. to an extrusion due and forcing it therethrough so that its temperature as it emerges from the die is not less than 200° C., the die having a ratio of width to thickness in excess of 100:1 and quenching the strip as it emerges from the die whereby its tensile strength within 6 hours of emerging from the die is at least 35 Newtons/square millimeter and converting the extruded strip to electrode form by a process which does not disturb its grain structure to such an extent that the tensile strength of the material falls below 35 Newtons/square millimeter.

According to a further aspect of the present invention a lead antimony alloy comprises 1 to 2.5% by weight antimony, e.g., 1.2 to 2.3% by weight preferably 1.3 to 2.0% by weight e.g., 1.5 to 1.7% by weight antimony and optionally 0.0005 to 0.01% by weight of a grain refining element or elements compatible with the alloy, the grain refining element preferably being selenium or sulphur or a mixture thereof and preferably being present in an amount of 0.001 to 0.007% e,g., 0.002 to 0.005% by weight, the alloy optionally containing one or more of the elements arsenic, tin, bismuth, copper and silver preferably in an amount in total of not more than 0.3% by weight, the balance being lead, preferably in an amount of at least 97% e.g. at least 97.5 or at least 98% by weight.

One preferred such alloy contains 1.7% by weight antimony and 0.001–0.007% by weight selenium, balance lead.

The quenching can be carried out by any conventional means such as an airblast, a liquid spray or both, e.g., of oil or water effective to achieve the required rate of quenching.

The strip is preferably sprayed with water at flow rates effective to reduce the temperature of the strip surface to a temperature not in excess of 25° C. within 10 seconds of the strip emerging from the die.

Such spraying was, for example, found to be effective for strips about 0.035 inches thick (0.9 mms) and 4 inches (102 mms) wide (an aspect ratio of 114:1).

More broadly it is preferred that the strip should have been quenched within not more than 1 minute of emerging from the die e.g., to a temperature not in excess of 25° C.

The strip may be converted to a battery electrode structure merely by cutting the strip to separate lengths of the required dimension and attaching a current take off terminal thereto e.g., a lug or preferably by punching out the lug shapes during the cutting step so that the lugs are integral with the electrode structure. Such structures will be referred to herein as plain structures.

Battery electrode structures of apertured form e.g., for flat plates for automotive batteries can be provided with lugs in a similar manner to that described for plain plates above and may be apertured merely by punching out holes of appropriate shape and size from the strip. Spine or comb shaped electrode structures for use in tubular plates e.g., for motive power batteries can also be made from the extruded sheet by punching out the required slots between the spines leaving a yoke or bar connecting the spines together at one end.

Battery electrode structures can also be made by so called expanded metal techniques. Preferred forms of this technique involve slitting the strip in rows and then pulling the strip from one or both edges in a direction at right angles to the slits the length of pull being less than the length of the slit e.g., 30% to 70% of the length of each strip.

There are two main expansion techniques. One uses a strip having transverse non slitted regions out of which a selvedge is produced and from which the lugs are cut. Here the pulling force is applied along the length of the strip. The required strip width is then the width, which after longitudinal expansion (which will produce a shrinkage in the width of the strip), will produce the required electrode width. This therefore requires the strip to be wider than the finished electrode structure.

We thus prefer to use the alternative expanding techniques. In one form of this technique the selvedge is a continuous strip down the middle of the strip, slits are formed in rows parallel to the central selvedge, the slits being staggered from row to row, and the pulling force is transverse to the strip. Here the strip width must be such as to produce after expansion a strip having twice the height required of the battery electrode structure plus the selvedge and lug height. In another form of this technique, the selvedge is formed down one side of the strip rather than down the middle. Here the strip width must be such as to produce after expansion a strip having the height required of the battery electrode structure plus the selvedge and lug height.

DESCRIPTION OF THE PREFERRED EMBODIMENTS

The invention may be put into practice in various ways and various specific embodiments will be described by way of example to illustrate the invention, with reference to the accompanying diagrammatic perspective drawing. All parts are by weight.

A lead antimony alloy having the composition defined in Table 1 below was melted at 400° C. and supplied to an extruder 10 by being poured from a furnace 11 along a launder 12 into the inlet 13 of the extruder so as to solidify in the die chamber 14 (shown in chain lines).

The launder can be swung to one side after the die chamber has been filled, as indicated by the arrow 28. The die chamber 14 was 10 inches (25.4 cms) in diameter and was vertically disposed in a cubic die block 15 having 18 inch (45.8 cms) sides. The die chamber was closed at the bottom and open at the top and was carried on a vertically movable lower platen 16 with its opening 13 positioned opposite a fixed vertically disposed cylindrical upper platen 18 of 10 inches (25.4 cms) diameter arranged to be a tight sliding fit in the die chamber 14. The die block 15 had a die orifice 20 located in one side wall opposite to and communicating with the die chamber 14, the orifice being 0.5 inches (12.7 mms) thick at the die chamber and 0.035 inches (0.9 mms) thick at its outlet. The pressure required to raise the lower plate 16 is quoted as the extrusion pressure and is also given in Table 1. The solidified metal in the die chamber was heated to the extrusion temperature, also given in Table 1, by gas burners 21 playing on the sides of the die block, the heated solid metal was extruded through the die 20 whose outlet 22 was 4 inches (102 mms) wide and 0.035 inches (0.9 mms) thick. The temperature of the metal rose as it passed through the die due to friction.

Jets of water ⅛ inches (3.2 mm) in diameter were directed against the top and bottom surfaces of the strip by a pair of transverse spray bars 23 located 3 inches downstream from the die (if these were any closer the age hardening was not produced, the die had to be kept hot). The strip sloped downwards out of the die and the water ran over the strip for about 3 feet (92 cms) downstream of the die. The water flow was such that the surface temperature of the strip 4 inches (102 mms) from the die was less than 25° C. The film of water over the next 3 feet (92 cms) ensured that the strip was thoroughly cooled. The strip was extruded at a constant rate given in Table 1 and wound up on a roll 25 under a low tension insufficient to cause the strip to narrow. The tensile strength was then measured using a load cell of 1 metric tonne and an extension rate of 12.5 mms/minute, at various times after extrusion as given in Table 1.

TABLE 1

| Example | 1 | 2 | 3 |
|---|---|---|---|
| Alloy % | Sb 1.9 | Sb 1.3 | Sb 1.3 |
| | Se 0.003 | Se 0.002 | Se 0.002 |
| | Sn 0.002 | Sn 0.001 | Sn 0.001 |
| | As 0.084 | As 0.057 | As 0.057 |
| | Cu 0.001 | Cu 0.007 | Cu 0.007 |
| | Traces | Traces | Traces |
| Extrusion Pressure p.s.i. | 3000 | 3000 | 3000 |
| Extrusion Temperature °C. | 240 | 240 | 180 |
| Extrusion rate ft/min | 6–10 | 6–10 | 6–10 |
| Tensile Strength at specified time after extrusion Newtons/mm$^2$ | | | |
| 6 hours | 38 | 36 | 30 |
| 30 hours | 57 | 45 | 33 |
| 54 hours | 63 | 49 | 39 |

7 days after being extruded the strips were slit and expanded to mesh form in conventional manner and then pasted with conventional active material and dried and cured and assembled into batteries.

Tests on the samples of the strips involving maintaining the strips at 80° C. for 4 hours revealed that the strips of Example 1 had a tensile strength after cooling to ambient temperatures (15° C.) after 24 hours of 58 Newtons/mm$^2$.

I claim:
1. A method for making a metallic alloy strip less than 0.05 inches (1.27 mm) thick having an aspect ratio of width to thickness in excess of 10:1 comprising:
 (a) supplying at a temperature of 200° to 280° C. to an extrusion die having said aspect ratio an alloy consisting essentially of antimony 1–2.5% by weight with the balance lead and inevitable impurities;
 (b) forcing said alloy through said extrusion die; and

(c) quenching the strip as it emerges from the die whereby its tensile strength within 6 hours of emerging from the die is at least 35 newtons/square millimeter.

2. A method of making an electrode for a lead acid storage battery which comprises supplying a lead antimony alloy containing 1.3 to 1.9% by weight antimony at a temperature in the range 200° C. to 280° C. to an extrusion die and forcing it therethrough so that its temperature as it emerges from the die is not less than 200° C., the die having a ratio of width to thickness in excess of 100:1, and quenching the strip as it emerges from the die whereby its tensile strength within 6 hours of emerging from the die is at least 35 Newtons/square millimeter.

3. A method for making an electrode for a lead storage battery comprising:
(a) supplying at a temperature of 200°–280° C. to an extrusion die an alloy consisting essentially of 1.3% to 1.9% antimony by weight with the balance lead and inevitable impurities;
(b) forcing said alloy through said extrusion die to form an alloy with its temperature as it emerges from said die not less than 200° C. with said strip having a ratio of width to thickness in excess of 100:1;
(c) quenching said strip as it emerges from the die whereby its tensile strength within 6 hours of emerging from said die is at least 35 N/mm$^2$; and
(d) converting the said extruded strip to an electrode form by a process which does not disturb its grain structure to such an extent that the tensile strength of the material falls below 35 newtons/square millimeter.

4. A method as claimed in claims 1, 2 or 3 in which the strip is sprayed with water at flow rates effective to reduce the temperature of the strip surface to a temperature not in excess of 25° C. within 10 seconds of the strip emerging from the die.

5. A method for making an electrode for a lead acid storage battery comprising:
(a) supplying at a temperature of 200°–280° C. to an extrusion die an alloy consisting essentially of 1.3 to 1.9% antimony by weight with the balance lead and inevitable impurities;
(b) forcing said alloy through said extrusion die to form an alloy strip with its temperature as it emerges from said die not less than 200° C. with said strip having a ratio of width to thickness in excess of 100:1; and
(c) quenching said strip as it emerges from the die whereby its tensile strength with 6 hours of emerging from the die is at least 35 newtons/square millimeter.

6. A sheet of lead antimony alloy said alloy consisting essentially of 1.3 to 1.9% by weight antimony with balance lead and inevitable impurities, said sheet having a thickness in the range of 0.2 to 1.5 mms and an aspect ratio of at least 10:1, and a tensile strength in excess of 40 newtons/square millimeter.

7. A sheet as claimed in claim 6 in which the aspect ratio is in the range 50:1 to 200:1.

8. An extruded sheet of lead antimony alloy, said alloy consisting essentially of 1.3 to 1.9% by weight antimony with balance lead and inevitable impurities, said sheet having a thickness in the range of 0.2 to 1.5 mms and a ratio of width to thickness in the range of 50:1 to 200:1 and a tensile strength in excess of 45 newtons/millimeter square.

* * * * *